United States Patent
Tuel, Jr. et al.

(10) Patent No.: US 6,824,029 B2
(45) Date of Patent: Nov. 30, 2004

(54) UNDER-SEAT STORAGE BIN FOR EXTENDED CAB PICKUP TRUCKS

(76) Inventors: Dennis Tuel, Jr., 16553 County Hwy. 29, Dalton, MN (US) 56324; Danny Lee Ouren, 518 Bancroft Ave. East, Fergus Falls, MN (US) 56537

( * ) Notice: Subject to any disclaimer, the term of this patent is extended or adjusted under 35 U.S.C. 154(b) by 99 days.

(21) Appl. No.: 10/358,091

(22) Filed: Feb. 4, 2003

(65) Prior Publication Data

US 2004/0149791 A1 Aug. 5, 2004

(51) Int. Cl.[7] ................................................ B60R 7/00
(52) U.S. Cl. ................ 224/275; 224/42.11; 220/532; 296/37.15; 296/37.6; 297/188.09
(58) Field of Search ........................ 224/275, 402, 224/42.11; 220/532, 533; 296/37.15, 37.6; 297/188.09, 188.12

(56) References Cited

U.S. PATENT DOCUMENTS

| | | | |
|---|---|---|---|
| 3,131,813 A | 5/1964 | Jensen | 206/19.5 |
| 4,256,340 A | 3/1981 | Dunchock | 296/24 R |
| 4,593,816 A * | 6/1986 | Langenbeck | 206/425 |
| 5,072,852 A * | 12/1991 | Smith et al. | 220/495.09 |
| 5,249,724 A | 10/1993 | Green | 224/275 |
| 5,499,473 A * | 3/1996 | Ramberg | 43/55 |
| 5,597,201 A | 1/1997 | Hinze | 297/188.1 |
| 5,667,115 A | 9/1997 | Verhaeg | 224/275 |
| 5,902,009 A | 5/1999 | Singh et al. | 297/188.1 |
| 6,082,802 A | 7/2000 | Vigilante, Jr. | 296/37.15 |
| D428,701 S | 8/2000 | Lamo, Jr. | D3/313 |
| 6,106,044 A | 8/2000 | Schlachter | 296/37.15 |
| 6,386,612 B2 * | 5/2002 | Hofmann et al. | 296/37.15 |
| 6,644,523 B1 * | 11/2003 | Salas | 224/275 |

* cited by examiner

Primary Examiner—Stephen K. Cronin
(74) Attorney, Agent, or Firm—Curtis V. Harr

(57) ABSTRACT

A storage bin for use in extended cab pickup trucks having a rear seating area. The storage bin is an opened topped rectangular box, with a removable divider that is specifically designed to fit in the space beneath the rear seat the extended cab pickup truck. The use of the storage bin allows the owner of the extended cab pickup truck to store valuable items, such as electronics gear or guns in a secure manner that is out of sight from individuals on the outside of the vehicle.

14 Claims, 6 Drawing Sheets

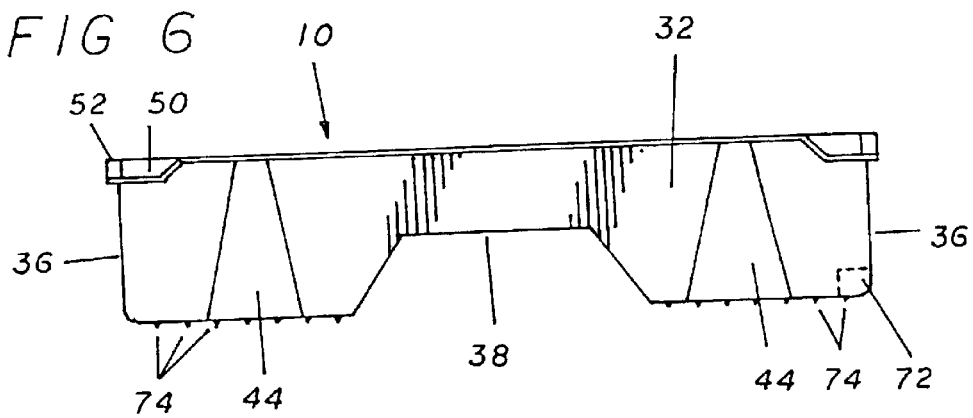
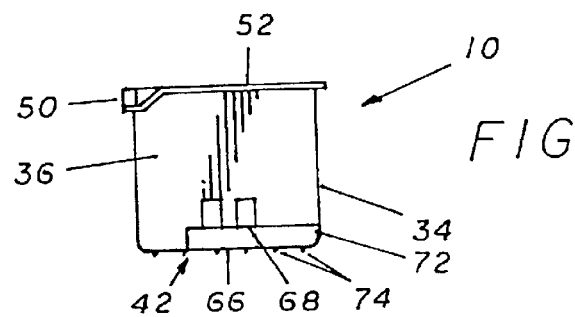
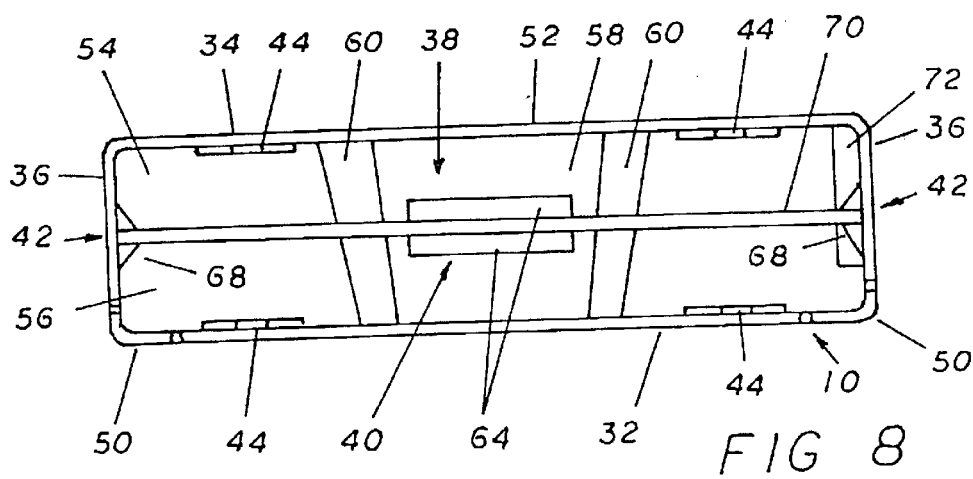

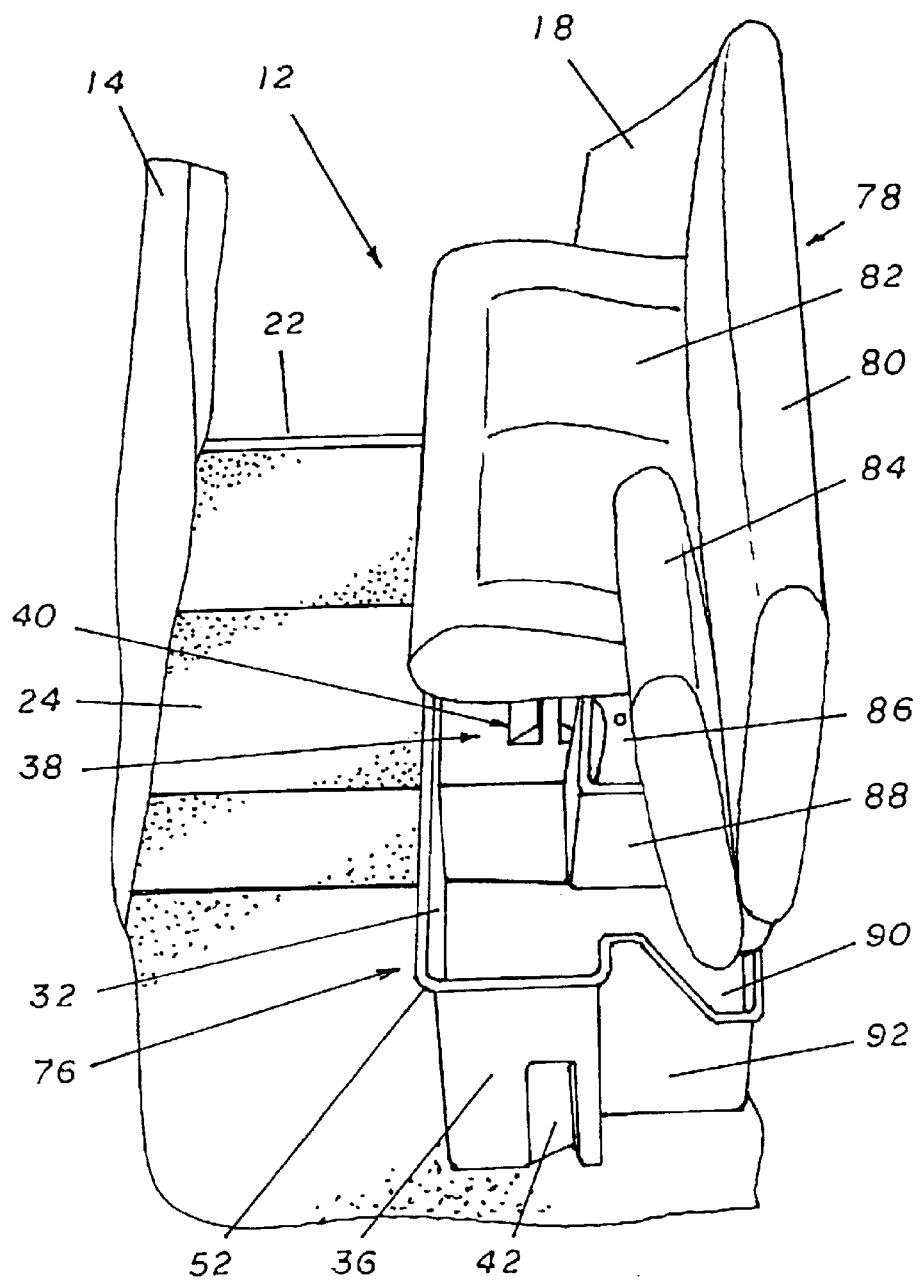

UNDER-SEAT STORAGE BIN FOR EXTENDED CAB PICKUP TRUCKS

BACKGROUND OF THE INVENTION

The present invention relates to an improvement in the methods used to provide storage in the interior of pickup trucks. More specifically, to a method of providing a secure and separate storage compartment underneath the rear folding seats that are in common use with the extended cab pickup trucks that are in the marketplace today.

The sale of pickup trucks represents a large percentage of the total number of vehicles sold today. Of this percentage, an increasing number of extended cab pickup trucks are being sold. An extended cab pickup truck is one that has an additional amount of interior cab space located directly behind the driver's seat and in front of the rear wall of the vehicle's cab. This space is generally used for storage and often contains a relatively small folding seat used to seat children or when the need arises, smaller adults.

Pickup trucks have always presented problems to their owners in the storage of valuables within the vehicle as they contain no large areas within which items can be stored in a manner that conceals their presence from view such as the trunks of passenger cars. The use of extended cab pickup trucks does help to alleviate this problem as they provide an area to store personal property within the locked interior of the vehicle. However, the items stored in this manner are still highly visible through its windows to persons standing outside the vehicle. This situation can actually promote break-ins (either by picking the door locks or simply breaking one of the vehicle's windows) as the relatively easy access to valuable items within the pickup can be difficult for persons inclined to such activity to pass up. Therefore, the use of the extended area of the pickup's cab as a storage space can actually lead to unnecessary damage to the vehicle and costly repair bills to its owner.

Additionally, the use of the extended cab area of such pickup trucks often results in the items being stored in a chaotic and cluttered manner. Outside of the visibility issues this creates as described above, this manner of storage can also create two other problems for the vehicle's owner. The first of these is that the chaotic manner of storage can result in damage to the items being stored. A couple of examples of the types of problems encountered as a result of this are the stock of a shotgun can be gouged or scratched to a degree that it devalues it or electronic gear becoming damaged due to their constant contact with other items as the vehicle shifts in the vertical and horizontal axises as it travels over streets and highways. The second problem associated with the storage of personal items in the extended portion of the pickup cab is it tends to make items hard to locate in a timely manner making it difficult for the vehicle owner retrieve things from the storage place when needed.

Therefore, it can be seen that it would be desirable to provide an apparatus which would allow the owner to store valuable items in the extended portion of an extended cab pickup in a manner so that they are not visible from the exterior of the vehicle, thereby lessening the chance loss of property and damage to the vehicle as a result of criminal break-ins. Additionally, that it would be desirable to provide such a storage mechanism that will protect the property from damage due to the constant motion of the vehicle. Finally, that it would also be desirable to provide such a storage mechanism that would allow the user to store valuables in a neat and organized manner allowing for their easy retrieval when needed.

SUMMARY OF THE INVENTION

It is the primary objective of the present invention to provide an apparatus which would allow the owner to store valuable items in the extended portion of an extended cab pickup in a manner so that they are not visible from the exterior of the vehicle, thereby lessening the chance loss of property and damage to the vehicle as a result of break-ins.

It is an additional objective of the present invention to provide such an apparatus which will provide such a storage mechanism that protects the personal property stored within it from damage due to the constant motion of the vehicle as it travels over streets and highways.

It is a further objective of the present invention to provide such an apparatus providing a storage mechanism that would allow the user to store valuables in a neat and organized manner allowing for their easy retrieval when needed.

These objectives are accomplished by the use of a storage bin that is an opened topped rectangular box that is specifically designed to fit in the space of the rear portion of an extended cab pickup truck that is formed by the folding down of the rear folding seat. The use of the storage bin allows the owner of the extended cab pickup truck to store valuable items, such as electronics gear or hunting rifles and shotguns, in a secure manner that is out of sight from individuals on the outside of the vehicle. Additionally, the present invention is large enough to store multiple rifles or shotguns and their associated cases in a secure manner.

The present invention is most commonly formed of a single piece of molded high impact plastic but can also be constructed from any other material that is suitable for the construction of these types of apparatuses. The use of the high impact plastic is very suitable for this application as it is easily shaped into the desired shape, it is strong and light weight providing a secure manner of containment for the stored items of personal property, and the color of the raw material used for its construction can be manipulated to match the interior color of the specific vehicle that it is used with. This color matching ability not only creates a more pleasing aesthetic, but also helps to conceal the presence of the storage bin thereby further lessening the chances of property loss or damage as a result of break ins.

Additionally, it is important to note that the present invention as illustrated is designed and constructed for use with late model full sized GENERAL MOTORS extended cab pickup trucks with an alternative embodiment shown for late model FORD extended cab pickup trucks. This illustration is employed for simplicity purposes and is not meant to imply that its use is limited to these specific vehicles. In fact, while the design of the rear seating area of the extended cab pickup trucks do vary from manufacturer to manufacturer, it has been contemplated to provide a similar storage bin for use in other brands of full sized extended cab pickup trucks and also for use in mid-sized and small extended cab pickup trucks.

The present invention is an opened topped rectangular box made up of a bin floor forming the bottom of the storage space and is the surface upon which the personal property to be stored is most commonly placed. The most forward long side of the rectangle defined by the bin floor forms the point of attachment for the front wall of the invention and which extends upward at a ninety degree angle. Additionally, the rearward long side of the rectangle also forms the point of attachment for the rear wall which mirrors the form of the front wall and further acts to confine the interior space of the present invention. Finally, the short sides of the bin floor are similarly equipped with the side walls which extend upwards in the same manner as described above for the front and rear walls and serve to horizontally enclose the space inside of the invention. This manner of construction forms the opened topped form of the storage bin and, as previously stated, is most often formed from a single piece of high impact plastic resulting in a very strong and durable apparatus that is perfectly suited to the purposes for which it was designed.

The bin floor is also specially designed to accommodate the drive train tunnel that is an integral part of the cab floor of all rear wheel drive vehicles which is in turn the most common means of power delivery in pickup trucks. The drive train tunnel is an upwardly oriented extension of the cab floor providing space for the vehicle's drive train, such as the transmission and drive shaft, to pass the rear end and deliver the necessary power. To compensate for the drive train tunnel, the present invention is built with a tunnel channel which effectively mirrors the shape of the drive train tunnel and allows it to fit perfectly over the drive train tunnel and also to make the most efficient use of the available space.

The tunnel channel of the present invention is constructed by raising the bin floor at its center portion to a height that corresponds to the level of the upper portion of the vehicle's drive train tunnel. This is accomplished by the installation of two tunnel walls on the bin floor in positions so that they each enclose the sides of the drive train tunnel. The tunnel walls extend from their point of attachment to the bin floor in a diagonal manner towards the center line of the body of the present invention. The upper portion of the tunnel walls terminate at approximately the halfway point of the depth of the interior of the storage bin. The space remaining between the tunnel walls is then covered by the tunnel cover which seals off the lower portion of the interior of the invention through its, and the tunnel wall's, connection to the front and rear walls. An additional advantage provided to the present invention by the use of the tunnel channel is that it fits precisely over the vehicle's drive train tunnel which has the affect of locking it into the desired position and ensuring that the valuables contained therein are provided with a stable storage environment within the extended cab pickup truck.

The operation of the flip-up rear seat and the open top of the present invention function together to both seal off the storage bin when necessary and to provide easy access to its interior when desired. The present invention is designed to be positioned so that when the rear flip-up seat is placed in the down or horizontal orientation for seating purposes, the flip-up seat serves as a cover to the invention concealing its contents. Conversely, when the operator wishes to gain access to the interior of the invention, he simply raises the folding seat to its vertical orientation which exposes its interior.

Additionally, the mechanism employed to facilitate the raising and lowering of the flip-up seat is a pair of release latches located on the bottom surface of the outer and forward corners of the flip-up seat which lock the flip-up seat in the horizontal position. To raise the flip-up seat, these latches are released and the flip-up seat is then pivoted upwards to expose the present invention. To allow access to the seat the release latches the forward corners of the present invention which are equipped with release latch notches which allow the user to reach in and activate the seat release latches to raise the flip-up seat.

The interior of the present invention is also designed with a plurality of features that allow its space to be further divided to customize it for storage purposes. The features described here are for illustrative purposes and it should be noted that the present invention is capable of being internally configured in a wide variety of configurations that have not been discussed. The division of the internal space of the present invention is accomplished by the use of a space divider which is a wall-like feature that is positioned in the center of the invention in a manner so that it divides the space in a longitudinal fashion. The space divider is so positioned by the use of the center space bracket located at the central point of the tunnel cover and by the use of the two side spacer brackets located on the inside lower center portion of the side walls. These brackets contain notches that correspond in size to the width of the space divider. The installation of the space divider is then accomplished simply by fitting the appropriate portions of the space divider into the brackets. The use of the space divider (as illustrated or in any other configuration) allows the operator to customize the interior space of the invention to fit their needs.

An alternative embodiment of the present invention has also been contemplated in which the configuration of the storage bin is altered to function in a pickup truck that employs the use of a split seat design in the rearward portion of the cab. In this design, the rearward portion of the storage bin is lowered, in relation to its upper lip, to accommodate the manner in which the split rear seats in these vehicles fold up to expose the storage bin. That is to say, the rearward portion of the folding split seat lowers towards the floor of the cab during the folding process and the body of the invention is designed so that it does not interfere with this process. With the exception of this design change, this embodiment of the present invention functions in the exact same manner as that previously described and therefore provides the secure place for storage in the same convenient fashion.

For a better understanding of the present invention reference should be made to the drawings and the description in which there are illustrated and described preferred embodiments of the present invention.

DESCRIPTION OF THE DRAWINGS

FIG. 6 is a front elevation view of the present invention illustrating the general configuration of the tunnel channel and the configuration and location of the release latch notches in the body of the invention.

FIG. 7 is a side elevation view of the present invention illustrating the location of the side spacer brackets and the release latch notches.

FIG. 8 is top elevation view of the present invention illustrating it as being configured with the space divider and the mechanisms employed to secure it to the other components of the invention.

FIG. 9 is a perspective view of a typical interior of an alternative extended cab pickup truck and illustrating the use of an alternative embodiment of the present invention designed to operate with a split folding rear seat.

DESCRIPTION OF THE PREFERRED EMBODIMENT

Figure 1:
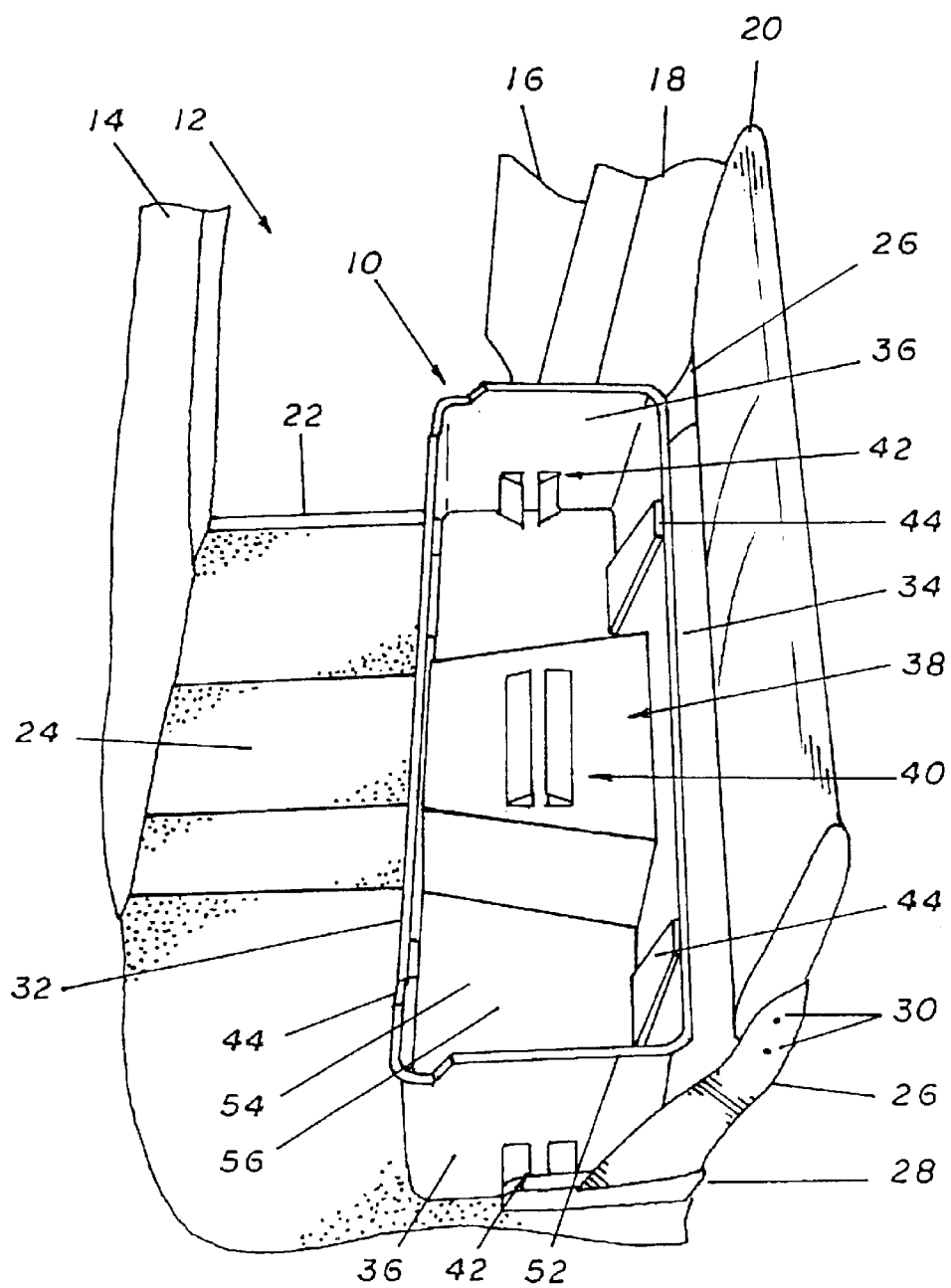
FIG. 1 is a perspective view of a typical interior of an extended cab pickup truck and illustrated as having the present invention properly installed therein.

Referring now to the drawings, and more specifically to FIG. 1, the storage bin 10 is designed to fit within an extended cab pickup's interior 12 in the space behind its front seat 14 and underneath its flip-up rear seat 20. The design of the cab body 18 provides extra space behind the front seat 14 of pickup trucks which is used for extra seating and for interior storage not otherwise available in standard body pickup trucks. With this design, the cab body 18 is extended rearward to provide a large degree of cab floor 22 space upon which the present invention rests while properly positioned. Additionally, the cab body 18 of these types of vehicles is often equipped with a rear door 16 which provides a greater degree of access to the interior spaces, and therefore, to the present invention and the personal property stored therein.

The present invention is a rectangular open topped box being comprised of a centrally located bin floor 56 which is enclosed by a plurality of vertically oriented walls to form its open top construction through the bin opening 54. The front and rear walls, 32 and 34, form the walls of the invention along the long sides of its rectangular shape with the side walls 36 completing the box by forming the walls on the short sides of the rectangular box. This manner of construction allows the user easy access to the interior of the invention and to its contents through the bin opening 54.

The cab floor 22 also provides the point of mounting for the tunnel channel 38 which is a centrally located intrusion into the interior space of the present invention. The tunnel channel 38 is a component of the invention designed to accommodate the vehicle's drive train tunnel 24. The drive train tunnel 24 is a hump in the cab floor 22 which has the purpose of supplying space for the drive line components of the vehicle and so does intrude into the interior space of the cab body 18. Therefore, the present invention is designed to accommodate this aspect of extended cab pickup trucks through the use of the tunnel channel 38.

The body of the present invention also contains a plurality of other features that contribute to its design functions, one of which is that the front and rear walls, 32 and 34, have a plurality of stiffening ridges 44 built into them which function to add a greater degree of lateral strength to the invention. This stiffening function is also augmented by the use of the bin lip 52 which is an outward extension of the upper surfaces of the front, rear, and side walls, 32, 34, and 36, and further enhances the overall rigidity of the structure of the present invention adding to its durability.

The flip-up rear seat 20 is mounted within the cab body 18 by the use of a pair of hinge mounts 28 which provide the point of pivotal attachment for the seat hinge members 26. The seat hinge members 26 are the components of the vehicle to which the flip-up rear seat 20 is fixedly attached through the use of a plurality of hinge bolts 30. The pivotal attachment of the seat hinge members 26 to the hinge mounts 28 allows them, and the attached flip-up rear seat 20, to be rotated from the point at which the flip-up rear seat 20 is in the horizontal position for seating purposes where the seat back 48 is exposed or to close off the open top of the present invention to the point at which the flip-up rear seat 20 is in the vertical position giving access to the interior of the invention (the differences between these two positions and the operation of the flip-up rear seat 20 are further illustrated in FIGS. 2 and 3).

As previously stated, the present invention is placed within the cab body 18 in a position so that it is entirely within the space beneath the flip-up rear seat 20. This positioning of the present invention, along with its opened top design, allows the flip-up rear seat 20 to not only provide additional seating for the vehicle's occupants, but also to operate as a defacto lid for the bin opening 54. These FIGURES also illustrate the manner in which the form of the drive train tunnel 24 is compensated for by the form of the present invention. An additional function of the bin lip 52 is also illustrated by showing the manner in which it serves to engage the lower surface of the flip-up rear seat 20 when it is in the horizontal position. This engagement of the bin lip 52 ensures that the present invention will not slide forwards or rearwards during the acceleration and deceleration of the vehicle in the course of its normal operations.

Figure 2:
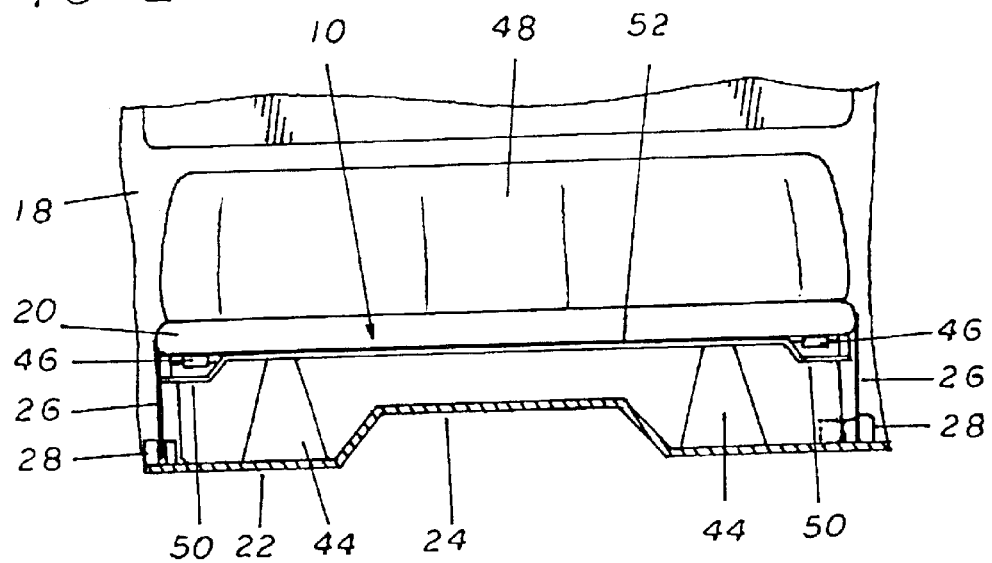
FIG. 2 is a front elevation view of the present invention as installed in an extended cab pickup truck which illustrates the manner in which the vehicle's flip-up seat is employed to close the open top of the invention.
Figure 3:
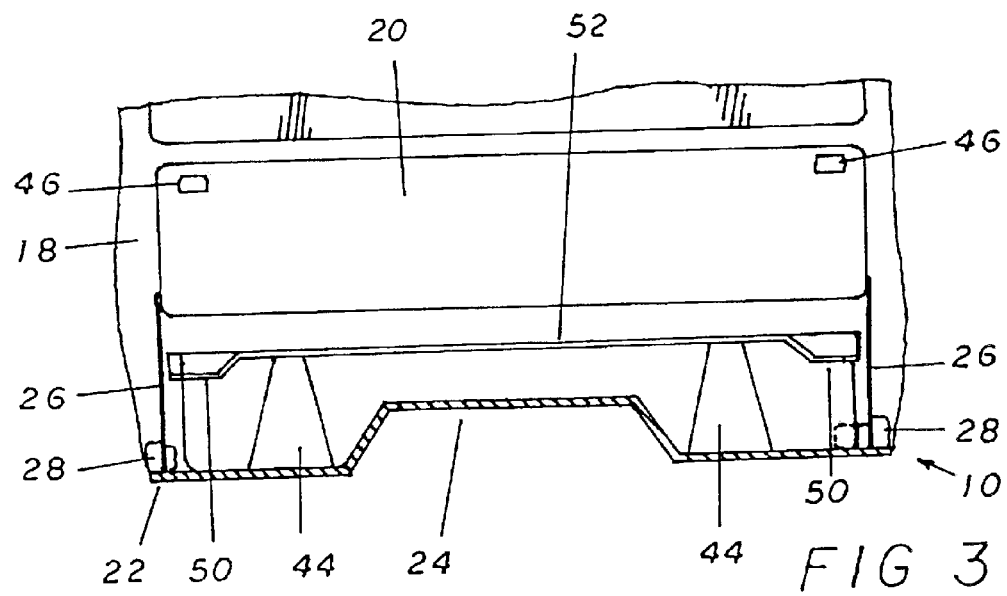
FIG. 3 is a front elevation view of the present invention as installed in an extended cab pickup truck which illustrates the manner in which the vehicle's flip-up seat is employed to expose the open top of the invention.
Figure 4:
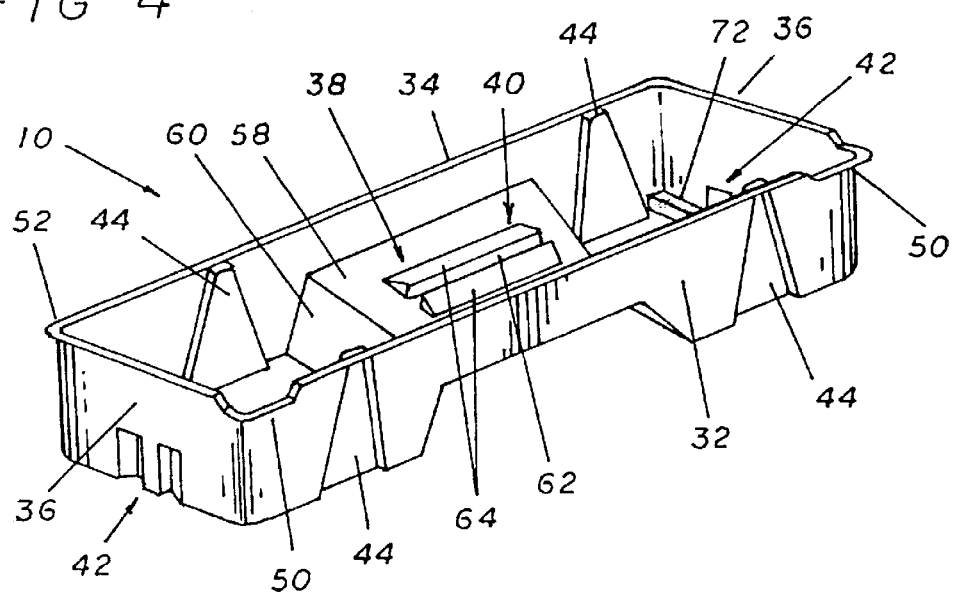
FIG. 4 is a perspective view of the present invention illustrating its general manner of design and the orientation of its major components.
Figure 5:
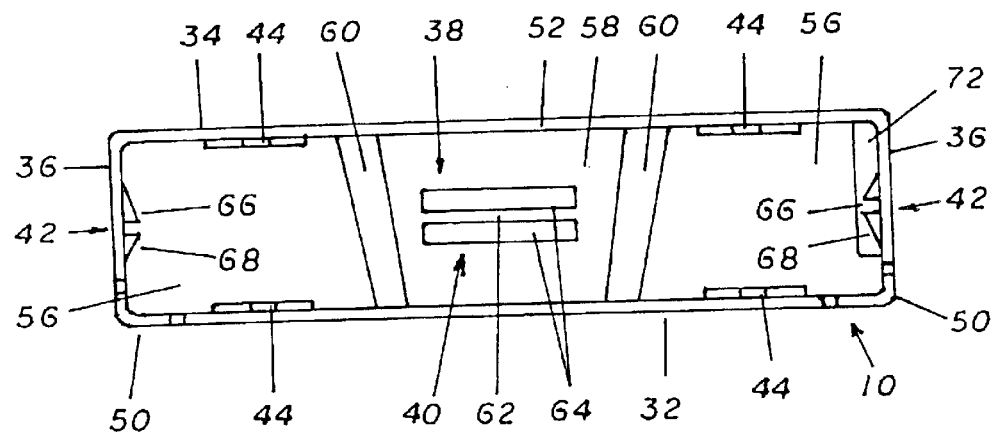
FIG. 5 is a top elevation view of the present invention detailing the position of its tunnel channel and the plurality of spacer brackets.

FIGS. 2 and 3 also illustrate the manner in which the seat release latches 46 are employed to secure the flip-up rear seat 20 in the horizontal position to serve as a cover for the present invention or for additional seating for the vehicle's occupants. The present invention is also equipped with a pair of release latch notches 50 formed into the upper corner of the junctions of the front wall 32 and the two side walls 36. The release latch notches 50 facilitate the release of the flip-up rear seat 20 by creating a gap at the point of location of the seat release latches 46 and allow the operator to raise and lower the flip-up rear seat 20 in the normal fashion without affecting the manner in which it operates to close off the bin opening 54 of the present invention.

Additionally, the present invention is equipped with features which serve to hold it in the proper location during the operation of the vehicle which are generally illustrated in FIGS. 4, 5, 6, 7, and 8. The first of these is located on the driver's side lower rear corner of the side wall 36 and which is comprised of a seat bracket notch 72. The seat bracket notch 72 is an inwardly oriented depression in the side wall 36 witch is designed to fit over the flip-up rear seat's 20 seat bracket 28 when the invention is properly installed. The lower surface of the present invention is also equipped with a plurality of grip points 74 which are downwardly points that serve to engage the upper surface of the cab floor 22. These design features ensure that the present invention is mounted securely within the desired position within the pickup's interior 12.

The general form and manner of construction of the present invention are further illustrated in FIGS. 4, 5, 6, and 7 which, as previously stated, is made up of a bin floor 56 being enclosed by vertically oriented front, rear, and side walls, 32, 34, and 36. Additionally, the lower center of the invention is equipped with a tunnel channel 38 constructed to accommodate the intrusion of the drive train tunnel 24. The tunnel channel 38 of the present invention is constructed by raising the bin floor 56 at its center portion to a height that corresponds to the level of the upper portion of the vehicle's drive train tunnel 24. This is accomplished by the installation of two tunnel walls 60 on the bin floor 56 in positions so that they each enclose the sides of the drive train tunnel 24. The tunnel walls 60 extend from their point of attachment to the bin floor 56 in a diagonal manner towards the center line of the body of the present invention. The upper portion of the tunnel walls 60 terminate at approximately the halfway point of the depth of the interior of the invention. The space remaining between the tunnel walls 60 is then covered by the tunnel cover 58 which seals off the lower portion of the interior of the invention through its, and the tunnel wall's 60, connection to the front and rear walls, 32 and 34.

The upper surface of the tunnel cover 58 also serves as the point at which the center spacer bracket 40 which operates in conjunction with two side spacer brackets 42 located on the lower interior surface of the side walls 36. These two features are employed with the use of the space divider 70 (illustrated in FIG. 8) to further compartmentalize the interior space of the present invention. The center spacer bracket 40 is made up of two center bracket walls 64 that are fixed to the surface of the tunnel cover 58 in a manner so that there is a center bracket notch 62 created. The width of the center bracket notch 62 corresponds to the width of the cross-section of the space divider 70. Additionally, the side spacer brackets 42 are similarly constructed having two side bracket walls 68 fixed to the side walls 36 in a manner leaving side bracket notches 66 between them. These side bracket notches 66 also correspond in width to the width of the space divider 70. Thus, the space divider 70 is employed by inserting the edges of the space divider 70 into the center spacer bracket 40 and the side spacer brackets 42 which hold it in a vertical orientation resulting in a divided interior of the present invention.

Figure 10:
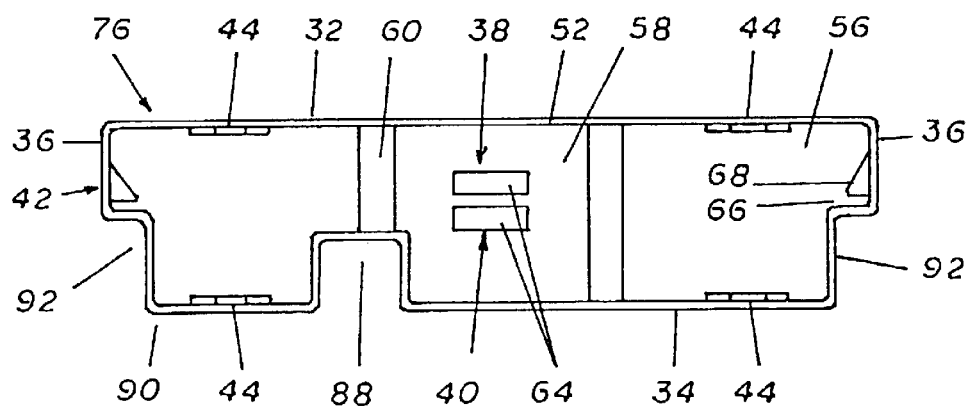
FIG. 10 is a top elevation view of an alternative embodiment of the present invention which is designed to be used in extended cab pickup trucks that employ a split folding rear seat design and illustrating the present design feature that make this application possible.
Figure 11:
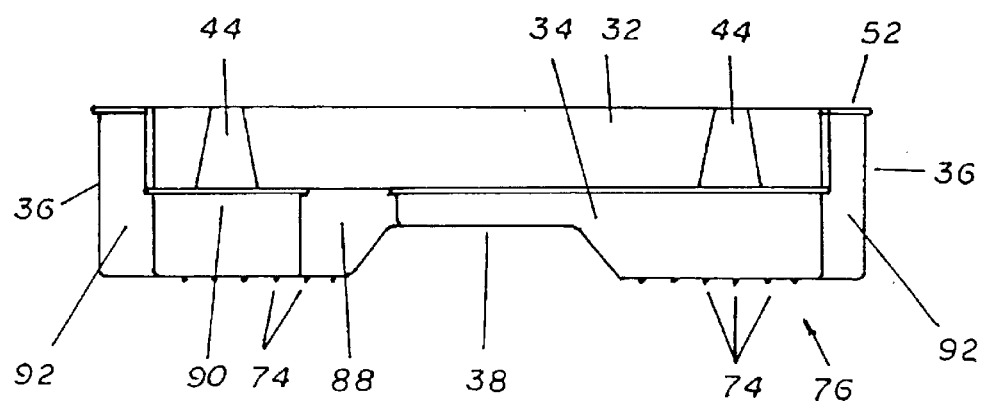
FIG. 11 is a rear elevation view of an alternative embodiment of the present invention illustrating the manner in which the rear wall is modified to accommodate the split folding rear seat.

An alternative embodiment of the present invention is illustrated in FIGS. 9, 10, and 11. These FIGURES illustrate that in its general manner of construction, the alternative storage bin 76 is very similar to the previous embodiment in that it is made up of a rectangular open topped box being comprised of a centrally located bin floor 56 which is enclosed by a plurality of vertically oriented walls to form its open top construction through the bin opening 54. The front and rear walls, 32 and 34, form the walls of the invention along the long sides of its rectangular shape with the side walls 36 completing the box by forming the walls on the short sides of the rectangular box. This manner of construction allows the user easy access to the interior of the invention and to its contents through the bin opening 54.

The primary differences in this embodiment of the present invention stem from the fact that it is designed to be used in vehicles that employ a split back seat 78. The typical split back seat 78 is made up of a single piece seat back 80 forming the back rest and a seating area comprising a larger 60 split seat 82 and a smaller 40 split seat 84. When in the horizontal position, these two components function together to form a cover for this embodiment of the present invention is the same manner as with the last. However, these two components are capable of being independently folded into a vertical orientation to expose either small portions of the alternative storage bin 76 or its entirety.

The design differences incorporated into the alternative storage bin 76 are a result of the split design of the split back seat 78 and the manner in which the 60 and 40 split seats, 82 and 84, are folded up to expose the invention. The split nature of the seating area requires the use of a center seat bracket 86 to support each component in the area of the division. This center seat bracket 86 is connected to the cab floor 22 in an area that is normally occupied by the body of the invention. To accommodate this design, the alternative storage bin 76 is configured with a center seat bracket notch 88 built into its rear wall 34. The center seat bracket notch 88 is an inward extension of the rear wall 34 which protrudes into the bin floor 56 and effectively moves the rear wall 34 forward in the area that corresponds to the location of the center seat bracket 86. This design feature allows this embodiment of the present invention to be properly positioned in a pickup truck that has a split back seat 76 configuration.

The other feature of the split back seat 76 that affects the design of the invention is the manner in which it is folded to expose the area below it. During the folding process, the rear surfaces of both the 60 and 40 split seats, 82 and 84, move towards the cab floor 22 due to the design of their hinges. This downward movement necessitates a design modification in the rear portion of the alternative storage bin 76 so that it does not interfere with the motion of the 60 and 40 split seats, 82 and 84. This is accomplished with the use of the seat accommodation depression 90 which is an area in the rearward portion of the invention in which the relative height of the side walls 36 and the rear wall 34 is lowered to make room for the lowering of the rear portion of the 60 and 40 split seats, 82 and 84. Additionally, the side walls 36 are also equipped with an inward depression called the outer seat bracket notches 92 which accommodate the hinging mechanism employed to fasten the outside edges of the split back seat 78 to the cab floor 22. Thus, the alternative storage bin 76 provides a secure storage mechanism for extended cab pickup trucks that employ a split back seat 78 design that functions in a substantially similar fashion as those which employ a solid folding rear seat configuration.

Although the present invention has been described in considerable detail with reference to certain preferred versions thereof, other versions are possible. Therefore, the spirit and scope of the appended claims should not be limited to the description of the preferred versions contained herein.

What is claimed is:

1. A storage bin, adapted for use in an extended cab pickup truck having a rear seat, said storage bin comprising:
   an elongate front and back wall, a left and right side and a storage bin floor having an upper and lower surface such that said storage bin is configured to fit beneath said rear seat of said extended cab pickup;
   a tunnel channel formed by said storage bin floor such that said tunnel channel straddles the drive train tunnel of said extended cab pickup truck; and
   a left and right side spacer bracket on said left and right side of said storage bin respectively such that said left and right side spacer brackets form a channel running perpendicular to said storage bin floor and opening toward said tunnel channel.

2. A storage bin, adapted for use in an extended cab pickup truck having a rear seat, as in claim 1 said storage bin further comprising a center spacer bracket on the upper side of said storage bin floor such that said center spacer bracket forms a channel running parallel to said storage bin floor.

3. A storage bin, adapted for use in an extended cab pickup truck having a rear seat, as in claim 2 said storage bin further comprising a plurality of grip points extending downward from said lower surface of said storage bin.

4. A storage bin, adapted for use in an extended cab pickup truck having a rear seat, as in claim 3 said storage bin further comprising a removable elongate space divider that slides into said left, right and center bracket channel so as to divide said storage bin into front and rear storage section.

5. A storage bin, adapted for use in an extended cab pickup truck having a rear seat, as in claim 4 said storage bin further comprising a plurality of stiffening ridges on said front and said back walls.

6. A storage bin, adapted for use in an extended cab pickup truck having a rear seat, as in claim 5 said storage bin further comprising a bin lip on said left and right sides and said front and back walls so as to reinforce said sides and walls.

7. A storage bin, adapted for use in an extended cab pickup truck having a rear seat, as in claim 6 said storage bin further comprising a left and right release latch notch formed by said left and right side and said front wall.

8. A storage bin, adapted for use in an extended cab pickup truck having a rear seat, as in claim 6 said storage bin further comprising a center seat bracket notch formed by said rear wall and said storage bin floor.

9. A storage bin, adapted for use in an extended cab pickup truck having a rear seat, said storage bin comprising:

an elongate front and back wall, a left and right side and a storage bin floor having an upper and lower surface such that said storage bin is configured to fit beneath said rear seat of said extended cab pickup;

a plurality of grip points extending downward from said lower surface of said storage bin;

a tunnel channel formed by said storage bin floor such that said tunnel channel straddles the drive train tunnel of said extended cab pickup truck;

a bin lip on said left and right sides and said front and back walls so as to reinforce said sides and walls; and a left and right side spacer bracket on said left and right side of said storage bin respectively such that said left and right side spacer brackets form a channel running perpendicular to said storage bin floor and opening toward said tunnel channel.

10. A storage bin, adapted for use in an extended cab pickup truck having a rear seat, as in claim 9 said storage bin further comprising a plurality of stiffening ridges on said front and said back walls.

11. A storage bin, adapted for use in an extended cab pickup truck having a rear seat, as in claim 10 said storage bin further comprising a center spacer bracket on the upper side of said storage bin floor such that said center spacer bracket forms a channel running parallel to said storage bin floor.

12. A storage bin, adapted for use in an extended cab pickup truck having a rear seat, as in claim 11 said storage bin further comprising a removable elongate space divider that slides into said left, right and center bracket channel so as to divide said storage bin into front and rear storage section.

13. A storage bin, adapted for use in an extended cab pickup truck having a rear seat, as in claim 12 said storage bin further comprising a left and right release latch notch formed by said left and right side and said front wall.

14. A storage bin, adapted for use in an extended cab pickup truck having a rear seat, as in claim 12 said storage bin further comprising a center seat bracket notch formed by said rear wall and said storage bin floor.

* * * * *